United States Patent
Jung et al.

(10) Patent No.: US 9,688,911 B2
(45) Date of Patent: Jun. 27, 2017

(54) YTTRIUM ALUMINUM GARNET PHOSPHOR AND SYNTHESIS METHOD THEREOF

(71) Applicant: RESEARCH & BUSINESS FOUNDATION SUNGKYUNKWAN UNIVERSITY, Suwon-si (KR)

(72) Inventors: Hyun Suk Jung, Seoul (KR); Min Jeong Kim, Seoul (KR); Eun Sang Yoo, Jeju-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 931 days.

(21) Appl. No.: 13/896,081

(22) Filed: May 16, 2013

(65) Prior Publication Data
US 2013/0306912 A1    Nov. 21, 2013

(30) Foreign Application Priority Data
May 18, 2012   (KR) .................. 10-2012-0052929

(51) Int. Cl.
*C09K 11/77* (2006.01)
(52) U.S. Cl.
CPC .............. *C09K 11/7774* (2013.01)
(58) Field of Classification Search
CPC . C09K 11/77; C09K 11/7734; C09K 11/7774; C09K 11/7721; C09K 11/7749; B22F 3/1112; C30B 29/28
USPC .................... 252/301.4 R; 427/157
See application file for complete search history.

(56) References Cited

U.S. PATENT DOCUMENTS

| | | | | |
|---|---|---|---|---|
| 6,210,625 B1* | 4/2001 | Matsushita | ............. | B01J 2/006 264/109 |
| 7,476,411 B1* | 1/2009 | Hampden-Smith | ...... | B01J 2/003 427/157 |
| 2001/0032963 A1* | 10/2001 | Kijima | ............... | C09K 11/7787 252/301.4 R |
| 2005/0227864 A1* | 10/2005 | Sutorik | ................... | B01J 21/04 502/304 |
| 2006/0058426 A1* | 3/2006 | Oda | ...................... | B82Y 30/00 523/210 |
| 2006/0083694 A1* | 4/2006 | Kodas | ................ | B01J 13/0043 424/46 |

(Continued)

OTHER PUBLICATIONS

Kim et al., "Cerium-Doped Yttrium Aluminum Garnet Hollow Shell Phosphors Synthesized via the Kirkendall Effect", Oct. 27, 2013, ACS Applied Materials and Interfaces, 6, pp. 1145-1151.*

(Continued)

*Primary Examiner* — Matthew E Hoban
*Assistant Examiner* — Lynne Edmondson
(74) *Attorney, Agent, or Firm* — NSIP Law

(57) ABSTRACT

Provided are an yttrium aluminum garnet (YAG) phosphor, YAG phosphor particles, and methods of fabricating the same. The method of fabricating an yttrium aluminum garnet (YAG) phosphor involves: dispersing aluminum hydroxide core particles in an aqueous solution comprising yttrium, urea, and a lanthanide element to form a shell on the aluminum hydroxide core particles; and calcining the aluminum hydroxide core particles with the shell formed thereon to obtain hollow YAG particles, in which the shell includes a compound of yttrium and a lanthanide element.

12 Claims, 11 Drawing Sheets

(56) References Cited

U.S. PATENT DOCUMENTS

| | | | |
|---|---|---|---|
| 2007/0096057 A1* | 5/2007 | Hampden-Smith .. | C09D 11/322 252/301.16 |
| 2010/0047157 A1* | 2/2010 | Fujita ....................... | C01F 7/36 423/625 |

OTHER PUBLICATIONS

Chatterjee, Minati, et al., "Synthesis of Yttrium-Aluminum-Garnet Hollow Microspheres by Reverse-Emulsion Technique." *Journal of the American Ceramic Society* 89.4 (2006): 1443-1446.

* cited by examiner

YTTRIUM ALUMINUM GARNET PHOSPHOR AND SYNTHESIS METHOD THEREOF

CROSS-REFERENCE TO RELATED APPLICATION

This application claims the benefit under 35 U.S.C. §119(a) of Korean Patent Application No. 10-2012-0052929, filed on May 18, 2012, the entire disclosure of which is incorporated herein by reference for all purposes. This application was supported by the Global Frontier R&D Program on Center for Multi-scale Energy System funded by the National Research Foundation under the Ministry of Science, ICT & Future, Korea (2012M3A6A7054864).

BACKGROUND

1. Field

The following description relates to a method of fabricating yttrium aluminum garnet (YAG) phosphor particles and synthesis method thereof, and to a spherical hollow YAG phosphor, spherical hollow YAG phosphor particles, and synthesis method thereof.

2. Description of Related Art

There are two major methods of obtaining white color emission using light emitting diodes (LEDs). One method involves combining light from a red LED, a green LED, and a blue LED. The other method involves applying a yellow phosphor to light emitted from a blue LED. In recent years, the application of white LED for lighting has substantially increased, and the latter method of using a yellow phosphor with a blue LED is widely used to obtain white light from LEDs. In this method, obtaining yellow phosphor with high efficiency in addition to obtaining high performance from the blue LED has become an important technical challenge.

A white LED light emitting element is generally formed in such a manner that a yellow phosphor is coated on a blue LED chip. The phosphor roughly includes a parent body and an activator element. The yellow phosphor that is widely used may use Ce as an activator in $Y_3Al_5O_{12}$ (YAG; Yttrium Aluminum Garnet) having a garnet structure. A YAG phosphor with Ce added thereto may generate intense excitation of light in a blue area of the spectrum and absorb the generated light to have a wide greenish yellow color. Therefore, the YAG phosphor may harmonize with the blue LED chip. In addition, a phosphor including YAG as a parent body is physically and chemically very stable due to its structural characteristics.

A conventional YAG phosphor is generally obtained by mixing, drying, calcining, and grinding metal oxides using a solid-state reaction method. Because this process is a time-consuming process and uses oxides as starting materials, the metal oxides should be calcined at a temperature of 1,600° C. or higher. As a result, several intermediate products such as $Y_4Al_2O_9$ (YAM) and $YAlO_3$ (YAP) may easily get mixed in the composition of the final product due to insufficient mixing and low reactivity of raw materials.

In addition, the composition and particle sizes of the final product are not uniform due to a solid-state reaction between particles and a long-time grinding that is required. Therefore, purity degradation and florescent characteristic degradation may occur due to pollution of the product. For example, when fabricating YAG:Ce phosphor powder, a yttrium oxide, an aluminum oxide, a cerium oxide, and the like are mixed for a long time to obtain a uniform mixture. The mixture is dried and calcined at a temperature of 1,700° C. or higher. In addition, even though a flux such as $BaF_2$ is added, a heat treatment temperature should be 1500° C. or higher. The strongly cohesive powder has to be grounded again for a long time. Thus, impurities may get mixed into the powder, and the particle size of the resulting powder is not uniform. The particle size of a phosphor powder generally needs to be 3 µm or less, as well as be uniform in size with a substantially spherical shape, to achieve high efficiency. However, a phosphor powder obtained by the solid-state reaction method does not have uniform particle sizes. For example, in a general distribution, when the average particle size is about 5 µm, a wide distribution range of typically about 1 to 20 µm may result.

The conventional commercial YAG phosphor has a low packing density due to the non-uniform shapes and sizes. Therefore, the luminance of the YAG phosphor may deteriorate, and a light-scattering loss may occur when the YAG phosphor is used in an LED chip.

SUMMARY

In one general aspect, there is provided a method of fabricating an yttrium aluminum garnet (YAG) phosphor involving: dispersing aluminum hydroxide core particles in an aqueous solution comprising yttrium, urea, and a lanthanide element to form a shell on the aluminum hydroxide core particles; and calcining the aluminum hydroxide core particles with the shell formed thereon to obtain hollow YAG particles, in which the shell including a compound of yttrium and the lanthanide element.

The method may further include: obtaining the aluminum hydroxide core particles dispersed in the aqueous solution by heat-treating an aluminum ion solution; and drying the aluminum hydroxide core particles having the shell formed thereon before the calcining of the aluminum hydroxide core particles, in which the calcining of the dried aluminum hydroxide core particles is performed in an oxygen atmosphere and a forming gas atmosphere; and the shell of the obtained hollow YAG particles has a substantially spherical shape.

The obtaining of the aluminum hydroxide core particles by heat-treating an aluminum ion solution may involve: dissolving aluminum nitrate, aluminum sulfate, and urea in the deionized water and then aging to obtain precipitates; and centrifugally separating the precipitates and washing the centrifugally separated precipitates with water.

The aqueous solution of yttrium, urea, and the lanthanide element may be prepared by dissolving yttrium nitrate, nitrate of the lanthanide element, and urea in deionized water.

The dispersing of the aluminum hydroxide core particles in the aqueous solution to form a shell on the spherical aluminum hydroxide core particles may include: dispersing the aluminum hydroxide core particles in the aqueous solution and then aging a mixture thereof to obtain aluminum hydroxide core particle precipitates with the shell formed thereon; and centrifugally separating the precipitates and washing the centrifugally separated precipitates with water.

Adjusting a mixing ratio of aluminum nitrate and aluminum sulfate may change sizes of the aluminum hydroxide core particles.

Adjusting the sizes of the aluminum hydroxide core particles may change sizes of the YAG particles.

The lanthanide element may be selected from a group consisting of Ce, Er, Tb, and Cr.

In another general aspect, there is provided a spherical hollow YAG phosphor that is fabricated according to the above methods.

In another general aspect, there is provided a method of fabricating an YAG phosphor including: heat-treating aluminum hydroxide particles at a temperature of 300° C. or more to obtain alumina core particles; dispersing the alumina core particles in an aqueous solution comprising yttrium, urea, and a lanthanide element to form a shell on the alumina core particles; and calcining the alumina core particles with the shell formed thereon to obtain hollow YAG particles, in which the shell includes a compound of yttrium and the lanthanide element.

The method may further include: obtaining the aluminum hydroxide core particles heat-treated to obtain the alumina core particles by heat-treating an aluminum ion solution; and drying the alumina core particles having the shell formed thereon before the calcining of the alumina core particles, in which the calcining of the dried alumina core particles is performed in an oxygen atmosphere and a forming gas atmosphere; and the shell of the obtained hollow YAG particles has a substantially spherical shape.

In another general aspect, there is provided a spherical hollow YAG phosphor, including: a shell having a central void formed by calcining an aluminum hydroxide core particle, in which the shell includes a compound of yttrium and a lanthanide element.

The lanthanide element may be at least one element selected from a group consisting of Ce, Er, Tb, and Cr.

The diameter of the phosphor may range between 100 nm to 800 nm.

In another general aspect, there is provided a spherical hollow YAG phosphor, including: a shell having a central void formed by calcining an alumina core particle, in which the shell includes a compound of yttrium and a lanthanide element.

The lanthanide element may be at least one element selected from a group consisting of Ce, Er, Tb, and Cr.

The diameter of the phosphor ranges between 100 nm to 800 nm

Other features and aspects may be apparent from the following detailed description, the drawings, and the claims.

Figure 1:
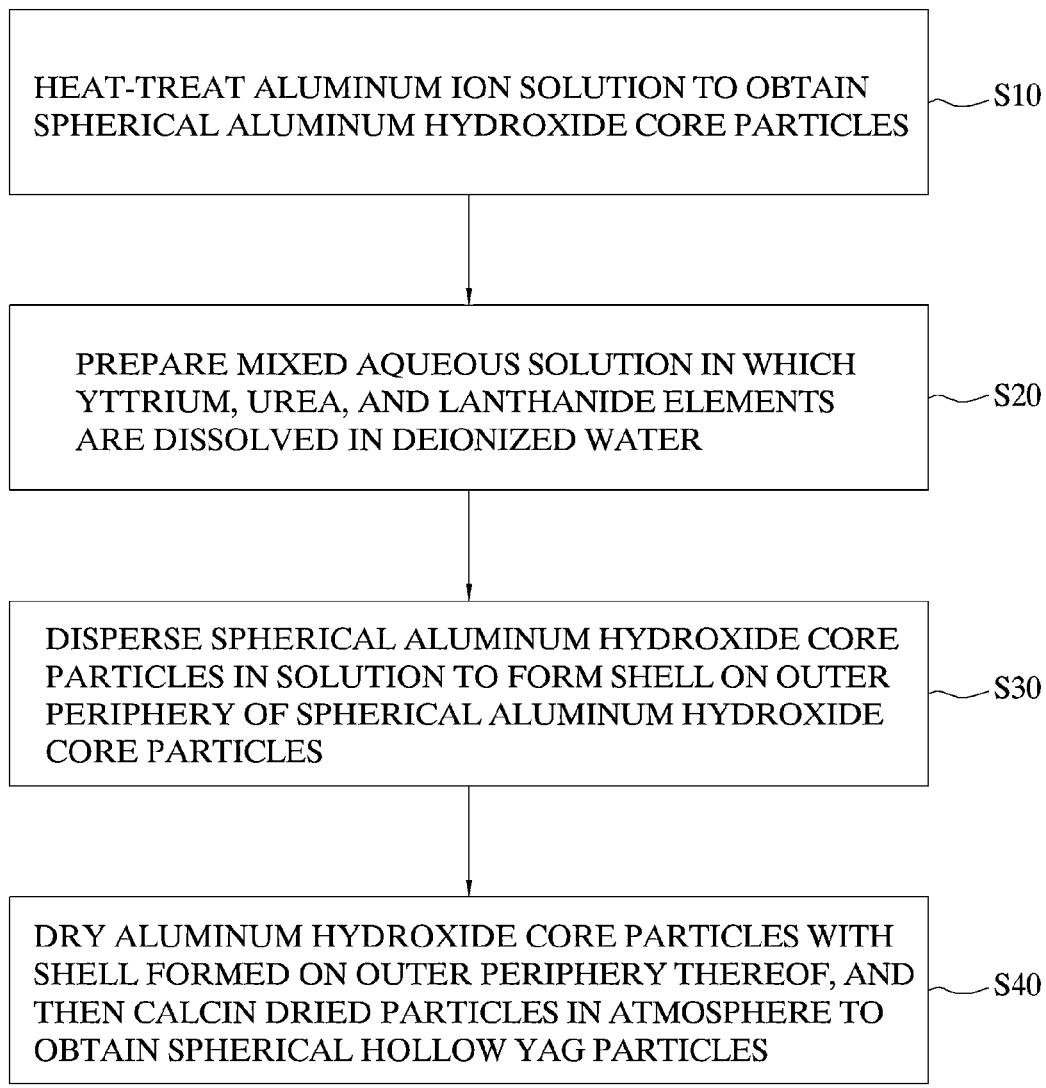
FIG. 1 is a flowchart illustrating an example of a method of fabricating a spherical hollow yttrium aluminum garnet (YAG) phosphor.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Various examples of methods of synthesizing yttrium aluminum garnet phosphor will be described below with respect to drawings.

According to one example illustrated in FIG. 1, a method of fabricating a spherical hollow yttrium aluminum garnet (YAG) phosphor involves heat-treating an aluminum ion solution to obtain spherical aluminum hydroxide core particles (step S10), preparing a mixed aqueous solution in which yttrium, urea, and lanthanide elements are dissolved in deionized water (step S20), dispersing the spherical aluminum hydroxide core particles in the solution to form a shell on an outer periphery of the spherical aluminum hydroxide core particles (step S30), and drying the aluminum hydroxide core particles with the shell formed on the outer periphery thereof, and then calcining the dried particles in an oxygen atmosphere and a forming gas atmosphere to obtain spherical hollow YAG particles (step S40).

FIG. 1 illustrates a flowchart of the method of fabricating the spherical hollow YAG phosphor. In this example, the shell may consist of a compound of yttrium and lanthanide elements.

Hereinafter, the method will be described in detail in a stepwise manner.

1. Heat-Treatment of Aluminum Ion Solution

Referring to FIG. 1, the aluminum ion solution is heat-treated to obtain spherical aluminum hydroxide core particles in S10.

In this example of a method of fabricating the spherical hollow YAG phosphor, an aluminum ion solution is heat-treated to obtain spherical aluminum hydroxide core particles, thereby forming a shell.

In this example, core particles are first obtained, and then a shell if formed. Therefore, the YAG phosphor that is obtained as the final product has a shape of a hollow sphere.

The heat-treating of S10 may involve: dissolving aluminum nitrate, aluminum sulfate, and urea in deionized water, and then aging the mixture to obtain precipitates; and centrifugally separating the precipitates and washing the centrifugally separated precipitates with the deionized water.

The aging performed in the heat-treating of S10 may be performed at a temperature of 95° C. or higher for about four hours. In this example, the size of the aluminum hydroxide core particles may be controlled by adjusting a mixing ratio of aluminum nitrate and aluminum sulfate. In addition, the size of the YAG particles may be controlled by adjusting the size of the aluminum hydroxide core particles.

Figure 7:
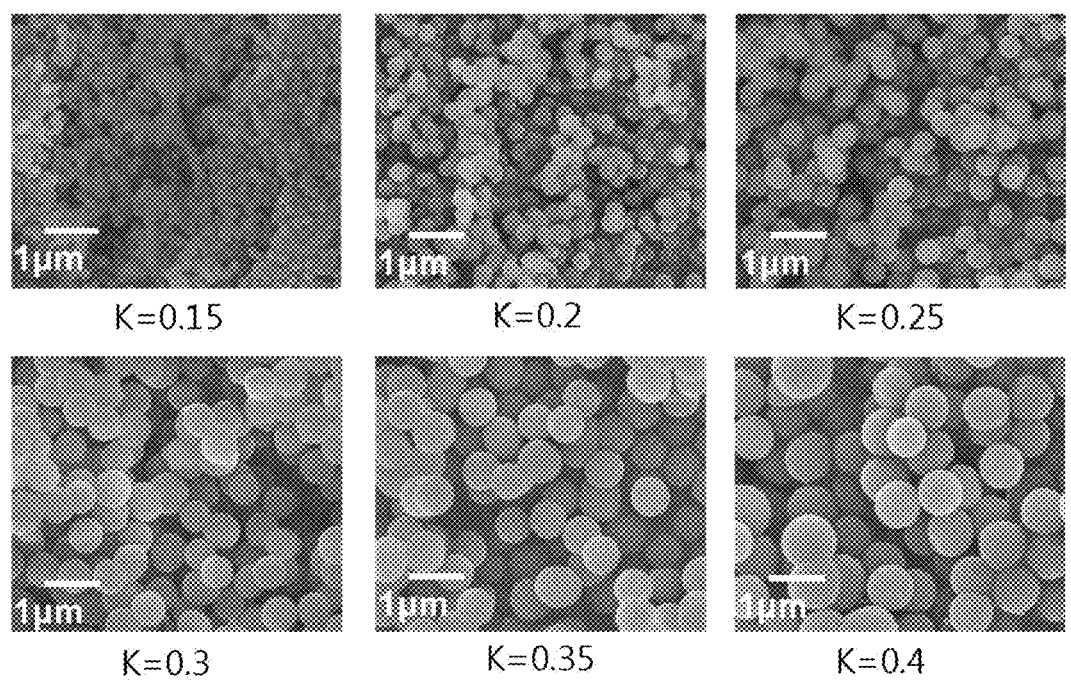
FIG. 7 is a diagram illustrating a change in particle sizes of aluminum hydroxide core particles according to various examples of methods of fabricating YAG phosphor.

Referring to FIG. 7, the mixing ratio of aluminum nitrate and aluminum sulfate is indicated by the symbol "K," and SEM images indicating size changes for the aluminum hydroxide (Al(OH)$_3$) core particles in accordance with various values of K (K=aluminum sulfate/aluminum nitrate) are illustrated.

As illustrated in FIG. 7, the size of the aluminum hydroxide core particles increases with an increase in K. That is, a relative increase in an amount of aluminum sulfate compared to an amount of aluminum nitrate results in an increase in the average size of the aluminum hydroxide core particles. Further, as illustrated in FIG. 7, the obtained particles are substantially uniform in sizes.

| K | Diameter (nm) of Al(OH)$_3$ |
|---|---|
| 0.15 | 183 |
| 0.2 | 317 |
| 0.25 | 435 |
| 0.3 | 640 |
| 0.35 | 742 |
| 0.4 | 828 |

For example, the size of the YAG particles may be adjusted to approximately 100 nm to 800 nm, which may be achieved by adjusting the size of the aluminum hydroxide core to approximately 100 nm to 900 nm.

2. Preparing Mixed Aqueous Solution

Referring to FIG. 1, a mixed aqueous solution in which yttrium, urea, and lanthanide elements are dissolved may be prepared with deionized water in S20.

The preparing of the mixed aqueous solution in S20 may involve: preparing a mixed aqueous solution in which yttrium, urea, and lanthanide elements are dissolved in deionized water. To obtain the mixture, yttrium nitrate, nitrate of lanthanide elements, and urea may be mixed with the deionized water.

The aluminum hydroxide core particles obtained in S10 may be dispersed in a manner similar to the dispersion of S30, which is described below.

3. Dispersing Spherical Aluminum Hydroxide Core Particles

Referring to FIG. 1, spherical aluminum hydroxide core particles are dispersed in aqueous solution to form shells on outer periphery of spherical aluminum hydroxide core particles, in S30.

The aluminum hydroxide core particles obtained in S10 may be dispersed and reacted in the mixed aqueous solution in which the yttrium, the urea, and the lanthanide elements prepared in S20 are dissolved in deionized water. With the dispersion, a shell is formed on an outer periphery of the aluminum hydroxide core particles.

The aluminum hydroxide core particles are dispersed in the mixed aqueous solution in which yttrium nitrate, nitrate of lanthanide elements, and urea are dissolved in the deionized water, and then aged to obtain aluminum hydroxide core particle precipitates with a shell formed on the outer periphery thereof.

Next, the spherical aluminum hydroxide core particles with the shell formed on the outer periphery thereof may be obtained by centrifugally separating the precipitates and washing the centrifugally separated precipitates with the deionized water.

In this example, the aging may be performed while performing stiffing at a temperature of about 85° C. for about three hours. In this instance, the shell consists of a compound of yttrium and lanthanide elements.

As the lanthanide elements, any one of Ce, Er, Tb, and Cr may be used. In this example, Ce may be used as the lanthanide element.

4. Drying and Calcination

Referring to FIG. 1, in S40, the aluminum hydroxide core particles with shells formed on an outer periphery thereof is dried. Then, the dried particles are calcined in oxygen atmosphere and then in forming gas atmosphere, to obtain spherical hollow YAG particles.

In the drying of S40, the aluminum hydroxide core particles with the shell formed on the outer periphery thereof that is obtained in S30 may be dried in a lyophilizer, and then calcined at a temperature of about 800° C. or higher for six hours to obtain the spherical hollow YAG particles.

In one example, Ce is used as the lanthanide element. In this example, a size of a final product of the spherical hollow YAG particles is approximately 600 nm at a calcination temperature of about 1,300° C., and a size of the particle is about 100 to 200 nm at a calcination temperature of 1,100° C.

By the above-described steps, the spherical hollow YAG particles according to one example of the present disclosure may be fabricated, which will be described herein in detail using various examples.

Method of Obtaining Spherical Hollow YAG Particles Using Alumina

According to the present example, the spherical hollow YAG particles are obtained using the aluminum hydroxide core particles. However, in other examples, the spherical hollow YAG particles may be obtained using alumina other than aluminum hydroxide core particles.

In this example, a method of obtaining spherical hollow YAG particles using alumina may include the above-described S10 to S40 illustrated in FIG. 1, and additionally may include heat-treating the spherical aluminum hydroxide core particles at a temperature of 300° C. or higher after S10. The remaining processes of S20 to S40 are the same as those described above. Thus, the repeated descriptions are omitted for conciseness.

When heat-treating the aluminum hydroxide core particles at a temperature of 300° C. or higher, aluminum hydroxide becomes alumina (Al$_2$O$_3$), and a spherical hollow YAG phosphor may be generated using the alumina through S20 to S40, as illustrated in FIG. 1.

Figure 9:
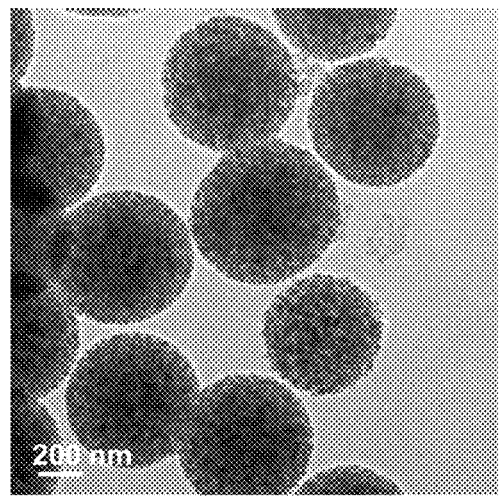
FIG. 9 is a photographic image showing an alumina particle according to an example of a method of fabricating YAG phosphor.

FIG. 9 is a TEM image of alumina obtained by heat-treating aluminum hydroxide core particles at a temperature of 300° C. or higher. As shown in FIG. 9, it can be found that alumina core particles have a spherical shape.

Figure 10:
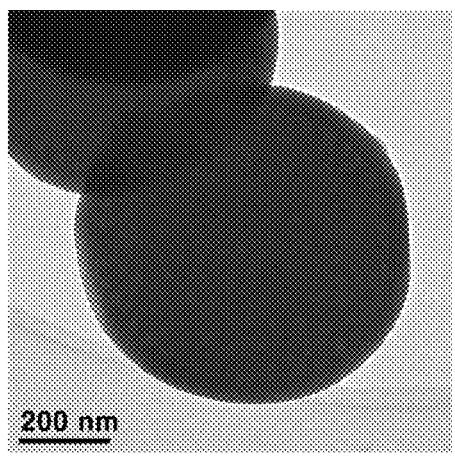
FIG. 10 is a photographic image showing an alumina core with a yttrium shell according to an example of a method of fabricating YAG phosphor.
Figure 11:
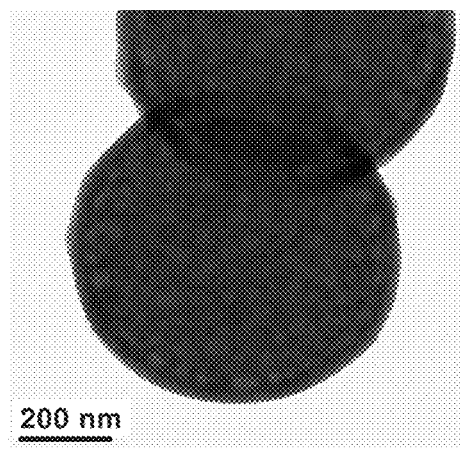
FIG. 11 is a photographic image showing an yttrium shell according to an example of a method of fabricating YAG phosphor.

FIG. 10 is a photo showing a state in which a yttrium shell is formed on an outer periphery of a core when alumina subjected to heat-treatment at a temperature of 300° C. or higher is used as the core. FIG. 11 is a photo showing a state in which a yttrium shell is formed on an outer periphery of a core when alumina subjected to heat-treatment at a temperature of 750° C. or higher is used as the core.

As illustrated, a spherical core-shell structure is still maintained.

Alumina core particles with the shell obtained in this manner may be dried in a lyophilizer, and then calcined at a temperature of 800° C. or higher for about six hours to obtain hollow YAG particles.

Example 1

Materials used in the experiment were urea ($CH_4N_2O$), aluminum nitrate ($AlN_3O_9 \cdot H_2O$), aluminum sulfate ($Al_2(SO_4)_3 \cdot 8H_2O$), yttrium (III) nitrate ($Y(NO_3)_3 \cdot H_2O$), and cerium (III) nitrate ($Ce(NO_3)_3 \cdot H_2O$), and these materials were purchased from Aldrich.

First, in order to obtain aluminum hydroxide core particles, aluminum nitrate, aluminum sulfate (Al concentration of 0.01M), and urea (0.1M) were dissolved in deionized water.

Next, the mixture was subjected to aging at a temperature of 97° C. for four hours to obtain aluminum hydroxide precipitates. The obtained precipitates were separated in a centrifugal separator, and then were washed with deionized water several times.

Next, a shell of lanthanide elements was formed on an outer periphery of the aluminum hydroxide core particles. In this experiment, cerium (Ce) was used as the lanthanide elements.

Yttrium nitrate (0.02M), cerium nitrate (0.01M), and urea (0.3M) were dissolved in deionized water, and the obtained aluminum hydroxide core precipitates were dispersed in this mixed solution.

Next, the solution was subjected to aging at a temperature of 85° C. for three hours while being subjected to vigorous stirring, thereby obtaining precipitates with shell formed on an outer periphery of the core particles. The shell consists of a compound of yttrium and cerium.

The precipitates were separated by a centrifugal separator, washed with deionized water several times, dried in a lyophilizer, and then calcined at a temperature of 800° C. to 1,300° C. for six hours in an oxygen atmosphere for six hours and then in a forming gas atmosphere for six hours.

In this manner, the synthesized particles have an absorption wavelength in 430 nm to 480 nm and an emission wavelength in 510 nm to 600 nm.

Figure 2:
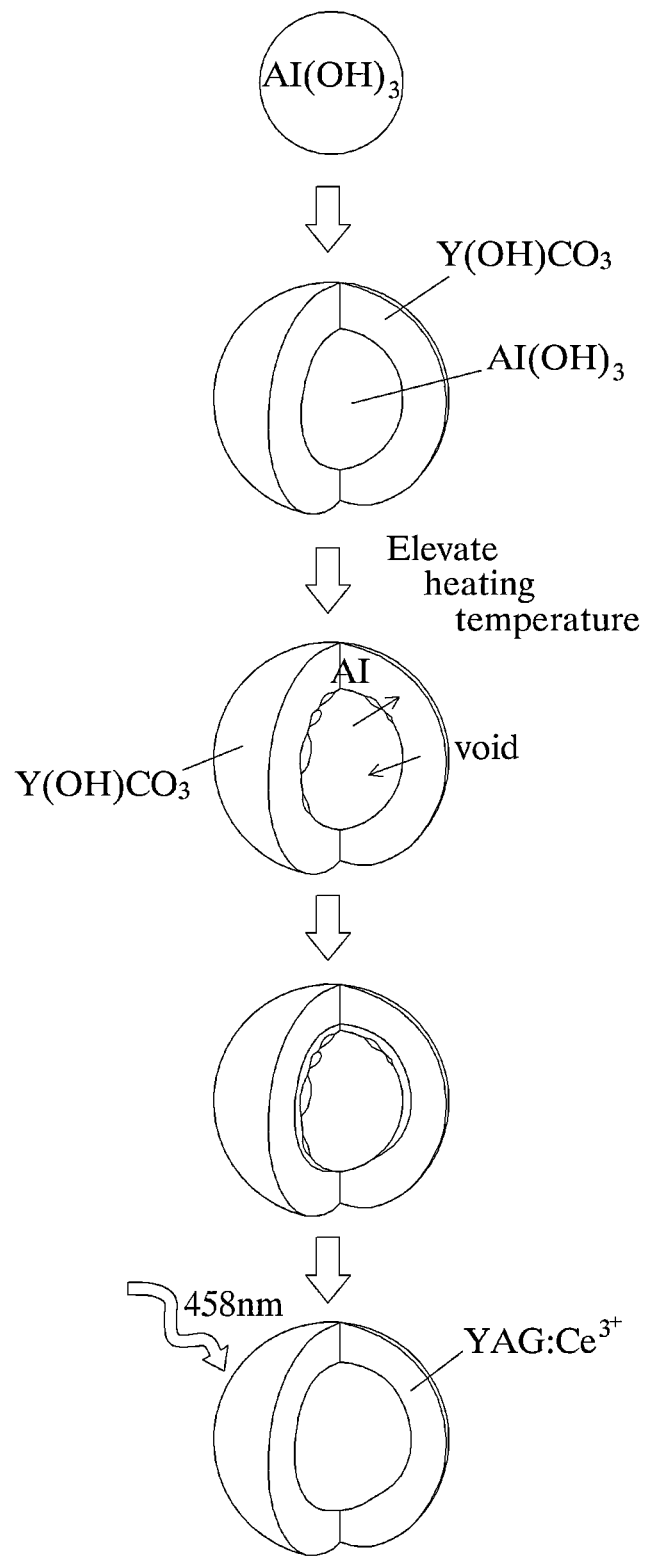
FIG. 2 is a schematic diagram illustrating the sequence of a process of synthesizing the spherical hollow YAG phosphor according to a general aspect.
Figure 3:
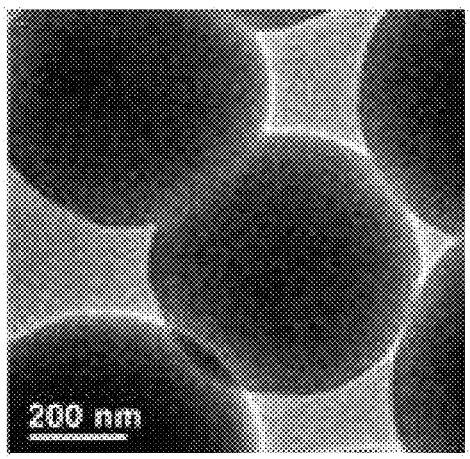
FIG. 3 is a diagram illustrating aluminum hydroxide core particles formed according to an example of a method of fabricating YAG phosphor.
Figure 4:
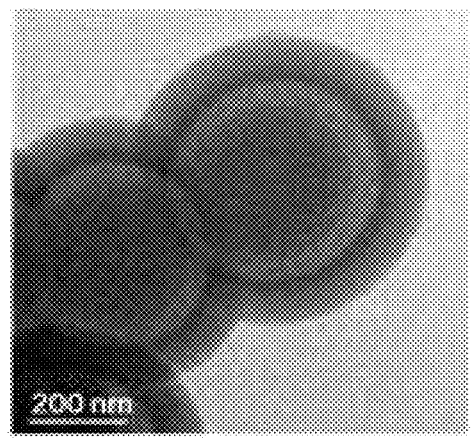
FIG. 4 is a diagram illustrating aluminum hydroxide particles with a shell formed on an outer periphery thereof according to an example of a method of fabricating YAG phosphor.
Figure 5:
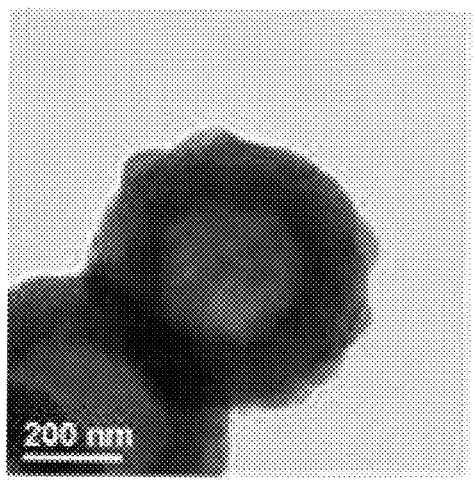
FIG. 5 is a diagram illustrating a spherical hollow YAG phosphor according to an example of a method of fabricating YAG phosphor.

FIG. 2 is a schematic diagram illustrating particles according to an example of synthesis method in a stepwise manner. FIG. 3 is a diagram illustrating aluminum hydroxide core particles formed according to the experiment. FIG. 4 is a diagram illustrating aluminum hydroxide particles with a shell formed on an outer periphery thereof. FIG. 5 is a diagram illustrating a spherical hollow YAG phosphor.

Figure 6:
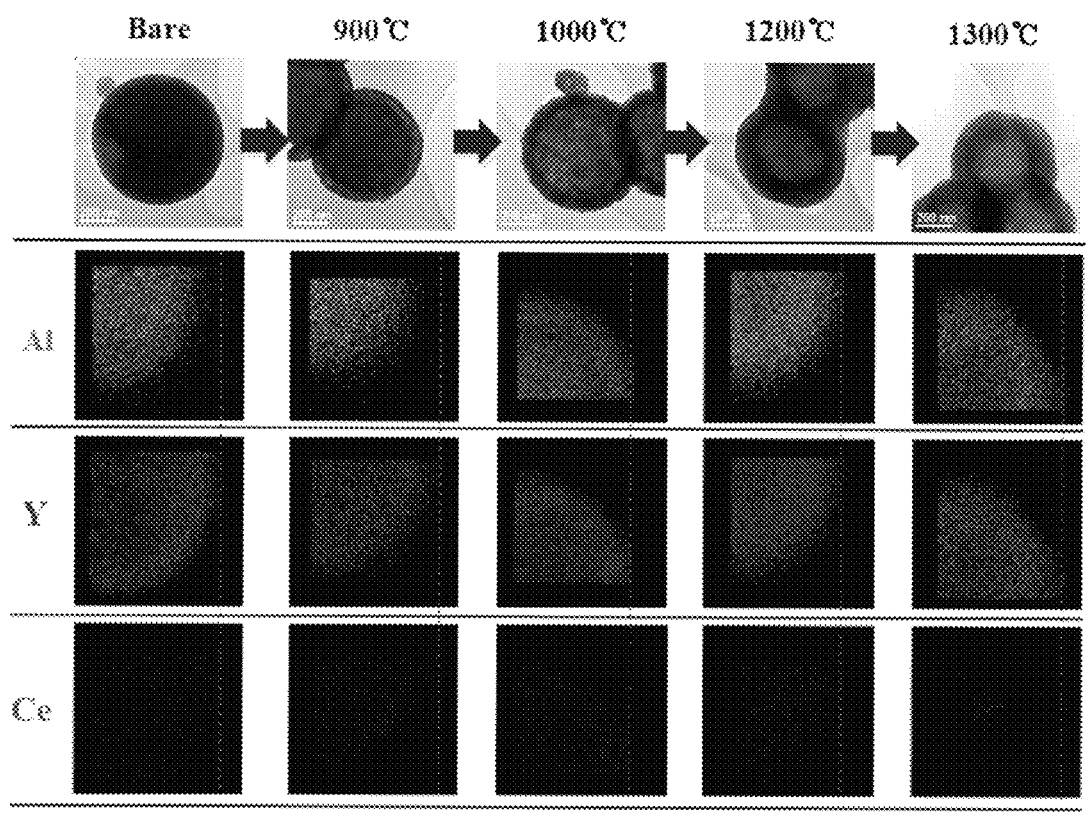
FIG. 6 is a diagram illustrating a spherical hollow YAG phosphor in accordance with a calcination temperature change according to an example of a method of fabricating YAG phosphor.

The particles of FIG. 5 are an SEM image of core-shell particles that are calcined at a temperature of 1,300° C. FIG. 6 is a diagram illustrating spherical hollow YAG particles that are changed by changing a calcination temperature in the experiment. As shown in FIG. 6, a diffusion reaction between Al-core and Y-shell may occur by performing heat-treatment, and therefore a hollow shape may be formed. When the heat-treatment temperature is raised, Al gradually and substantially diffused to Y-shell, forming a hollow shape.

Figure 8:
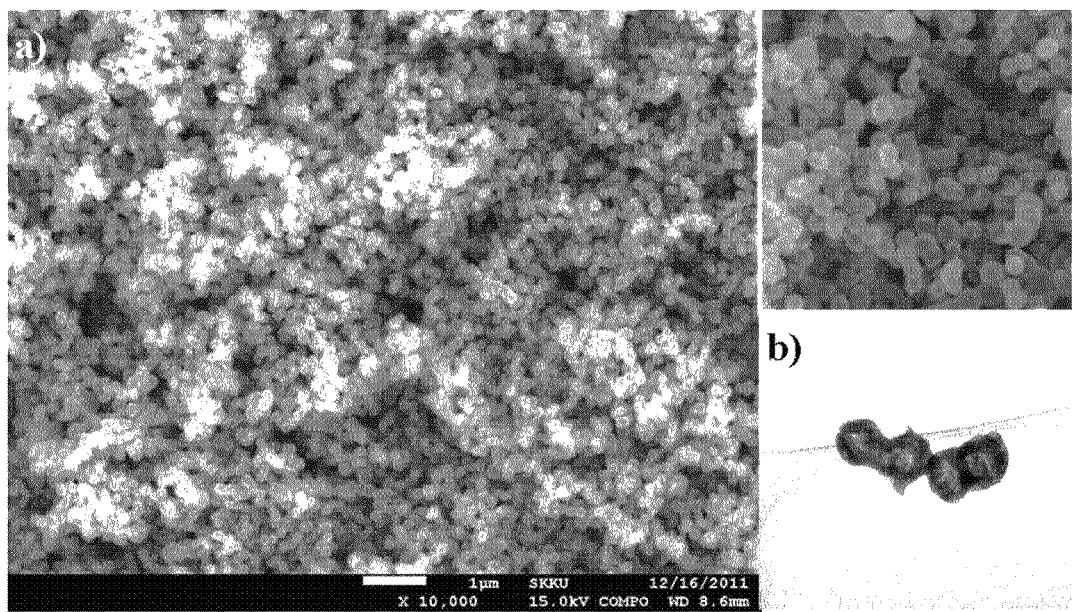
FIG. 8 is SEM and TEM image of YAG phosphor particles that are actually synthesized.

FIG. 8 is SEM and TEM photos of YAG phosphor particles (YAG:CE) that are actually synthesized. The synthesis was performed using aluminum hydroxide core of K=0.15, and Ce was used as the lanthanide elements. Heat-treatment was performed at a temperature 1,100° C. in an oxygen atmosphere for six hours and in a forming gas atmosphere for six hours, respectively.

Described above are various examples of methods of fabricating spherical hollow yttrium aluminum garnet (YAG) phosphor. An example of the method may include: heat-treating an aluminum ion solution to obtain spherical aluminum hydroxide core particles; preparing a mixed aqueous solution in which yttrium, urea, and lanthanide elements are dissolved in deionized water; dispersing the spherical aluminum hydroxide core particles in the solution to form a shell on an outer periphery of the spherical aluminum hydroxide core particles; and drying the aluminum hydroxide core particles with the shell formed on the outer periphery thereof, and then calcining the dried particles in an oxygen atmosphere and a forming gas atmosphere to obtain spherical hollow YAG particles, in which the shell consists of a compound of yttrium and lanthanide elements.

The heat-treating of the aluminum ion solution to obtain the spherical aluminum hydroxide core particles may include dissolving aluminum nitrate, aluminum sulfate, and urea in the deionized water and then performing aging to obtain precipitates, and centrifugally separating the precipitates and washing the centrifugally separated precipitates with the deionized water.

The preparing of the mixed aqueous solution in which yttrium, urea, and lanthanide elements are dissolved in the deionized water may include dissolving yttrium nitrate, nitrate of lanthanide elements, and urea in the deionized water.

The dispersing of the spherical aluminum hydroxide core particles in the solution to form a shell on an outer periphery of the spherical aluminum hydroxide core particles may include dispersing the aluminum hydroxide core particles in the mixed aqueous solution in which yttrium nitrate, nitrate of lanthanide elements, and urea are dissolved in the deionized water and then performing aging to obtain aluminum hydroxide core particle precipitates with the shell formed on the outer periphery thereof, and centrifugally separating the precipitates and washing the centrifugally separated precipitates with the deionized water.

The lanthanide elements may be any one of Ce, Er, Tb, and Cr.

Also described above are examples of spherical hollow YAG phosphor including: spherical aluminum hydroxide core particles; a shell formed on an outer periphery of the spherical aluminum hydroxide core particles; and a central void formed by calcining the aluminum hydroxide core particles and the shell, in which the shell consists of a compound of yttrium and lanthanide elements.

Also described above are examples of spherical hollow YAG phosphor including: spherical alumina core particles; a shell formed on an outer periphery of the alumina core particles; and a central void formed by calcining the alumina core particles and the shell, in which the shell consists of a compound of yttrium and lanthanide elements.

According to examples described above, the YAG phosphor particles having a core-shell structure may be formed using central core particles. Therefore, particles having uniform shapes and sizes may be obtained. For example, when the size of the YAG phosphor particles are adjusted within a range of 100 nm to 800 nm, at least 95% of particles may have a diameter within 5 nm from the average diameter of the particles. As a result, luminance deterioration and light-scattering loss due to low packing density, which results with phosphor particles obtained according to other methods, may be overcome.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of fabricating a yttrium aluminum garnet (YAG) phosphor, the method comprising:
   obtaining aluminum hydroxide core particles by heating an aluminum ion solution comprising aluminum nitrate, aluminum sulfate and urea;
   contacting the aluminum hydroxide core particles with an aqueous solution comprising yttrium, urea, and a lanthanide element or chromium to form an aqueous dispersion of aluminum hydroxide core particles having a shell formed thereon, wherein the shell comprises a compound of yttrium and the lanthanide element or chromium;
   obtaining aluminum hydroxide particles with a shell formed thereon from the aqueous dispersion;
   drying the aluminum hydroxide core particles having the shell formed thereon; and
   calcining the dried aluminum hydroxide core particles having the shell formed thereon in an oxygen atmosphere and a forming gas atmosphere to obtain hollow YAG particles,
   wherein the hollow YAG particles have a substantially spherical shape.

2. The method of claim 1, wherein the aqueous solution comprises yttrium nitrate, nitrate of the lanthanide element or chromium, and urea dissolved in deionized water.

3. The method of claim 1, wherein the obtaining of the aluminum hydroxide core particles having the shell formed thereon comprises:
   aging the aqueous dispersion to obtain aluminum hydroxide core particle precipitates with the shell formed thereon; and
   centrifugally separating the precipitates and washing the centrifugally separated precipitates with water.

4. The method of claim 1, wherein adjusting a mixing ratio of aluminum nitrate and aluminum sulfate changes an average size of the aluminum hydroxide core particles.

5. The method of claim 4, wherein adjusting the sizes of the aluminum hydroxide core particles changes an average size of the hollow YAG particles.

6. The method of claim 1, wherein the lanthanide element is selected from a group consisting of Ce, Er, and Tb.

7. A method of fabricating a yttrium aluminum garnet (YAG) phosphor, the method comprising:
   obtaining alumina core particles by heat-treating aluminum hydroxide core particles at a temperature of 300° C. or more;
   contacting the alumina core particles in an aqueous solution comprising yttrium, urea, and a lanthanide element or chromium to form a shell on the alumina core particles, wherein the shell comprises a compound of yttrium and the lanthanide element or chromium; and
   calcining the alumina core particles with the shell formed thereon to obtain hollow YAG particles.

8. The method of claim 7, further comprising:
   obtaining the aluminum hydroxide core particles by heat-treating an aluminum ion solution; and
   drying the alumina core particles having the shell formed thereon prior to the calcining of the alumina core particles with the shell formed thereon.

9. The method of claim 3, wherein the step of aging the mixture comprises stirring the mixture in the aqueous solution to thereby form the shell.

10. The method of claim 9, wherein the step of aging the mixture comprises stirring the mixture in the aqueous solution at a temperature of about 85° C. for about three hours to thereby form the shell.

11. The method of claim 1, wherein the obtaining of the aluminum hydroxide core particles further comprises:
   aging the aluminum ion solution to obtain precipitates; and
   centrifugally separating the precipitates and washing the centrifugally separated precipitates with water.

12. The method of claim 7, wherein the calcining of the dried alumina core particles with the shell formed thereon is performed in an oxygen atmosphere and a forming gas atmosphere.

* * * * *